Sept. 19, 1950 R. L. SCHUHMANN ET AL 2,522,643
GRINDER
Filed May 20, 1946 5 Sheets-Sheet 4

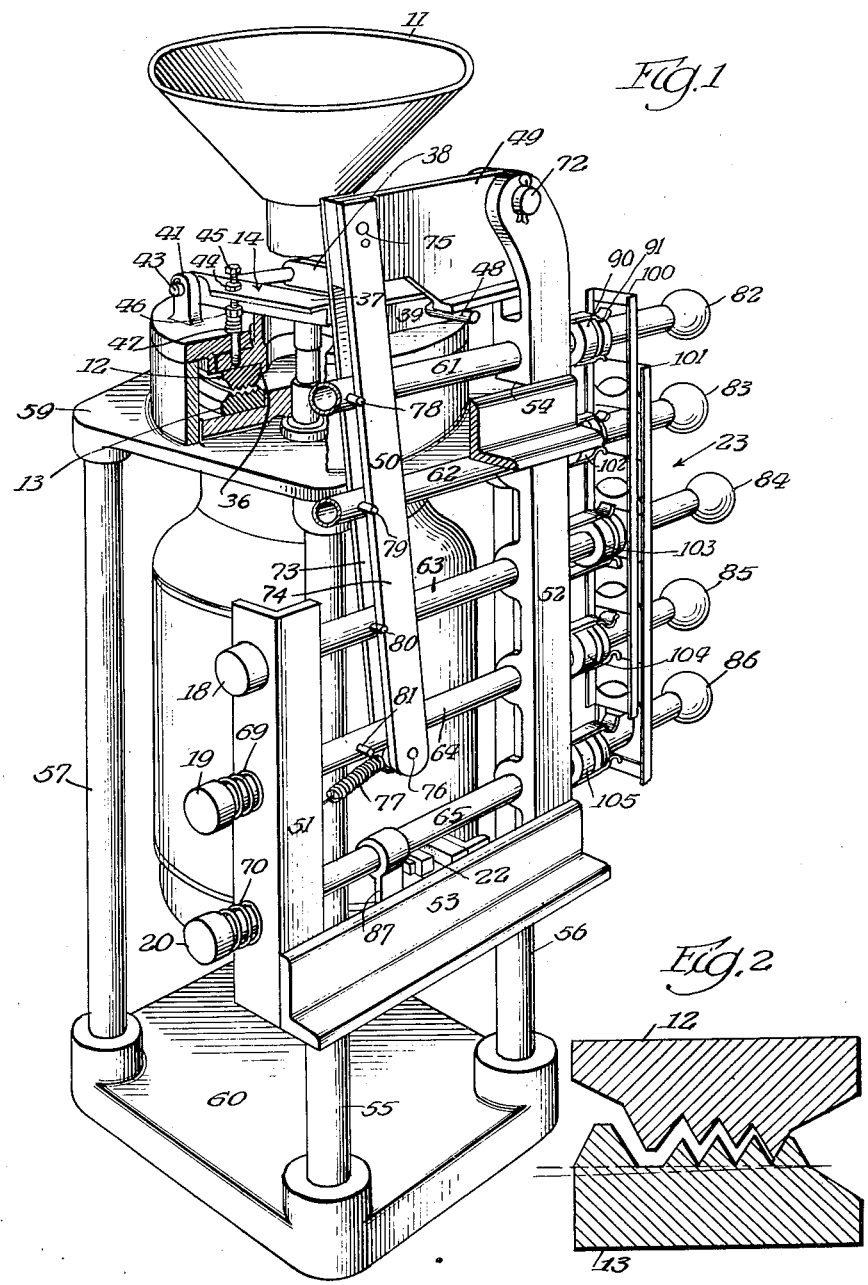

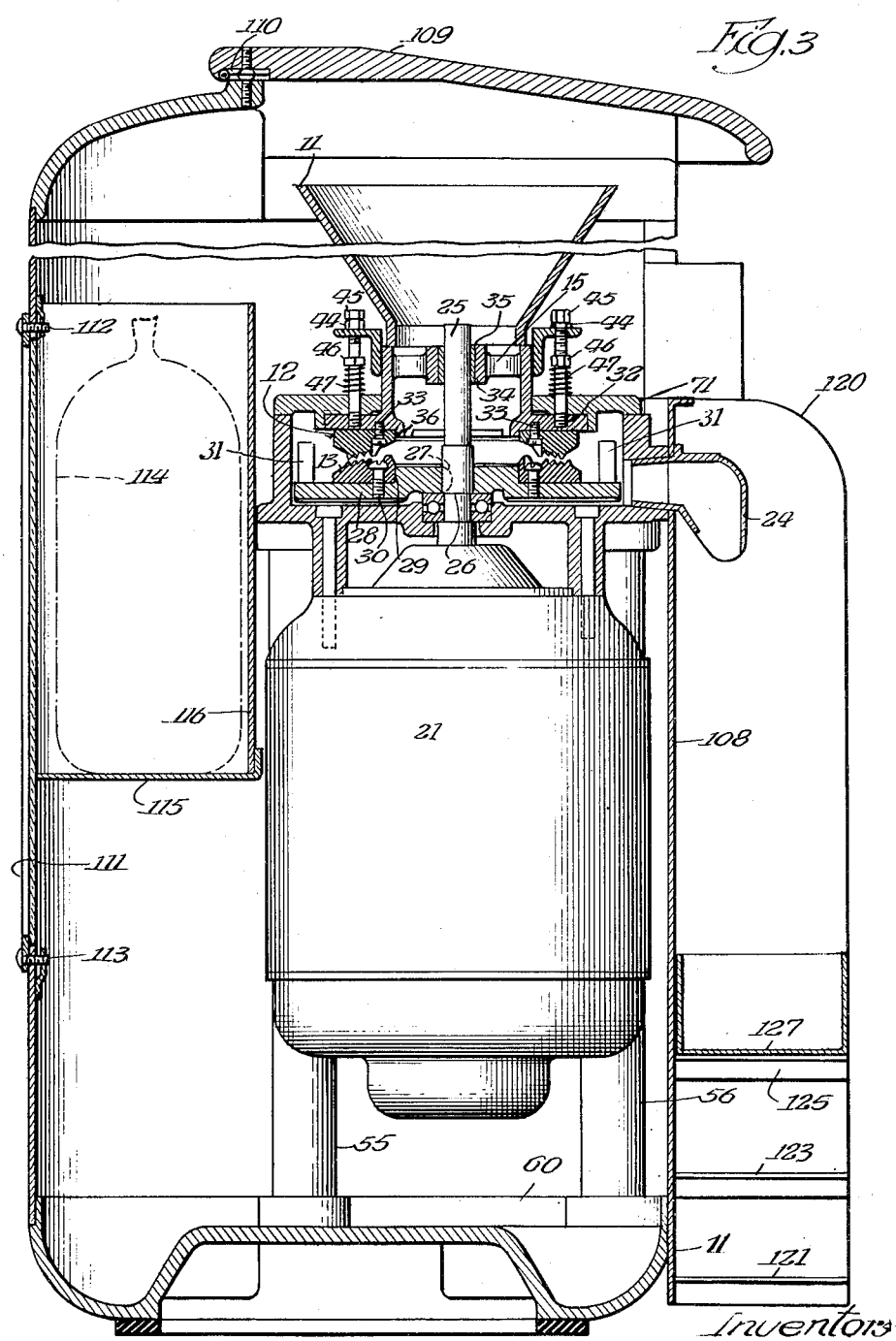

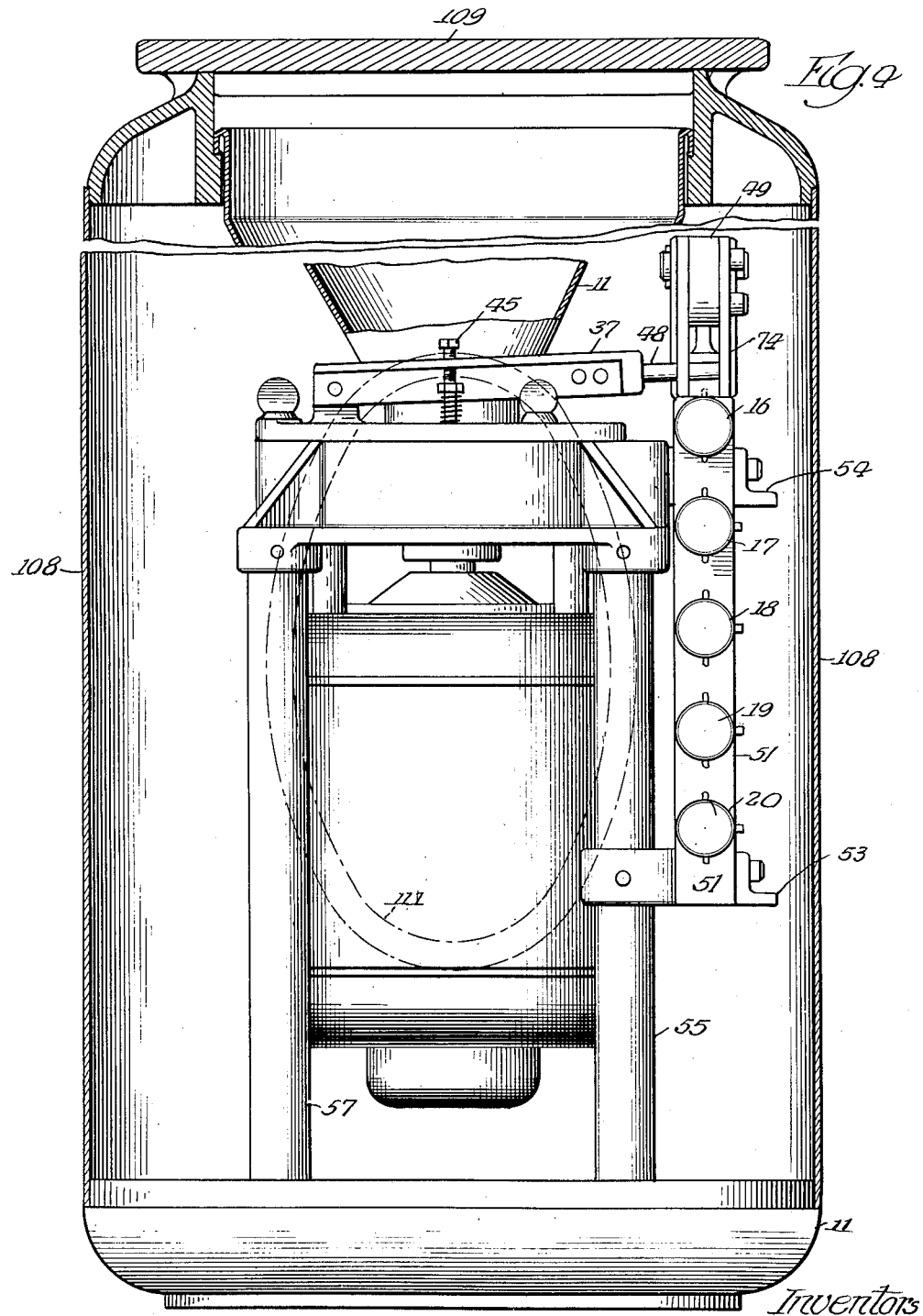

Inventors
RICHARD L. SCHUHMANN
FREDERIC C. RUDOLPH
By Clarence J. Loftus Atty.

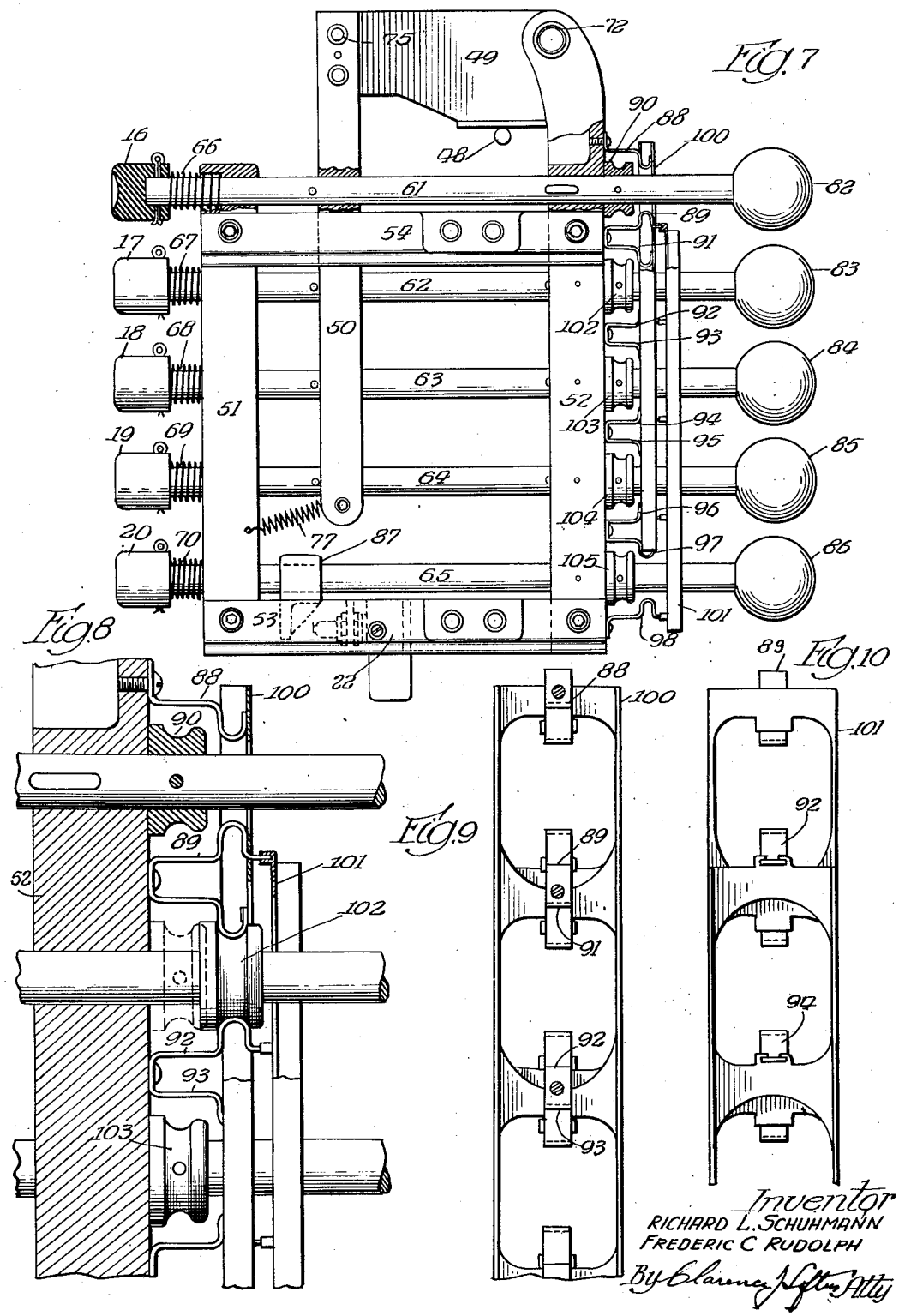

Patented Sept. 19, 1950

2,522,643

UNITED STATES PATENT OFFICE 2,522,643

GRINDER

Richard L. Schuhmann, Louisville, Ky., and Frederic C. Rudolph, New York, N. Y., assignors to American Duplex Company, Louisville, Ky., a corporation of Kentucky Application May 20, 1946, Serial No. 670,976

1 Claim. (Cl. 241—63)

The present invention relates to cereal grinding machines. While not limited to use in grinding coffee, it is of particular utility in that application and is so described herein.

In recent years progressive merchandisers have realized that a properly constructed coffee grinder not only performs the basic function of grinding coffee but also actually sells coffee. Marketing studies have demonstrated that such a coffee grinder is a sales builder, not only for coffee, but for other items in the retail establishment. It is therefore highly desirable to provide an improved, more reliable and accurate coffee grinder and to eliminate sources of service troubles and consumer complaints.

Coffee is presently sold in various grinds of which the major types are "Extra-fine, Vac," "Fine, drip," "Medium, Perc" and "Coarse, Pot," hereinafter referred to as "Vac," "Drip," "Perc" and "Pot." The most serious complaint registered by customers against conventional coffee grinders is that they often do not deliver coffee of the grinds ordered. Various attempts to solve this problem have been made. A primary object of our invention contemplates the providing of an improved coffee grinder which positively assures the correct grind and which reflects a radical departure from other developements addressed to the solution of this problem.

We solve this problem by providing a simple grind-control mechanism having a set of push buttons, each adapted when depressed to set the grinder for a different grind. When any one is depressed the operation of the mechanism is such as to release the others. Additionally, we provide an arrangement whereby stopping of the grinder motor at the same time places the grinder in such a condition that the appropriate one of the push buttons must be depressed and the grind positively selected before the grinder will operate in filling the next order.

It is impossible for an operator of our grinder to fill one coffee order, stop the grinder, and inadvertently or carelessly to fill the next order with the same grind setting, as so often happens when using prior-art grinders, much to the chagrin of customers. First, our grinder will not operate until a grind is deliberately and consciously selected. Second, our grind control mechanism includes dual controls and can be operated either by a store clerk on one side of a counter or by a customer on the other. Third, if operated by the clerk, the customer has a visual check on the grind chosen by the clerk. Thus we reduce the human factor of error to zero and eliminate a prime source of consumer complaints. Further, we provide a reliable self-service device which stirs consumer interest, is simple in operation and can be properly and accurately operated by almost anyone without previous training or experience.

A second source of consumer grievances is the lack of uniformity of grind so often characteristic of cereals processed by prior-art grinding devices. Customers demand, and have a right to insist on, quality and uniform consistency to the last grain. One of the major causes of such lack of homogeneity is the positioning of the grinder elements in such a fashion as to permit non-uniformity in burr-teeth alignment and as to introduce wear and mechanical eccentricities. Another object of our invention embraces the providing of an improved grinder having grinding elements positively positioned in concentric relation and having burr teeth uniformly aligned.

We solve the last-mentioned problem by providing in a cereal grinding mill a rotatable shaft, a pair of concentric burr carriers, one of the carriers being secured for rotation to the shaft and the other of the carriers being apertured to provide a bearing for the shaft. Mating concentric burrs are individually mounted on the carriers, the burrs being rotatably movable with respect to each other but maintained in radial registry by the shaft and bearing.

Another source of dissatisfaction arises from incomplete mixing of cereal and chaff. A further object of our invention is to eliminate this difficulty.

The major expense items in operating prior-art grinders are grinder-element replacement and the labor cost and lost-sales costs thereby occasioned. In accordance with objects of our invention we provide a grinder in which grinder-element wear is reduced to a minimum and in which worn burrs can be replaced quickly, easily, and economically, thus assuring continuity of operation and maximum sales return on equipment investment.

The above and other advantages and capabilities of our invention will be apparent from a detailed description of the accompanying drawings in which we have illustrated a preferred form of our invention, but the construction therein shown is to be understood as illustrative and not as defining the limits of our invention.

In the drawings:

Fig. 1 is a perspective view, partly in section, of a coffee grinder including a novel adjustable mechanism of grinding elements and a novel grind-control mechanism provided in accordance with our invention, the lid and cover of the grinder being removed;

Fig. 2 shows a fragmentary radial section through the burrs included in the Fig. 1 embodiment;

Fig. 3 is an elevational view, partly in section, taken on a plane parallel to the plungers illustrated in Fig. 1 and showing the display shelf, housing, lid and coffee-discharge spout;

Fig. 4 is an elevational view, partly in section, taken on a plane perpendicular to the plane of Fig. 3 and showing in outline the location of the display window;

Fig. 7 is a detailed side elevational view, partly in section, of the push-button grind-control assembly;

Fig. 8 is an exploded view of the detent arrangements shown in Fig. 7;

Fig. 9 is a front view, looking in a direction through the springs, of the inner clamp member for ganging the upper detent springs of the grind control; and Fig. 10 is a rear view of the outer clamp member for ganging the lower detent spring portions.

Figure 5:
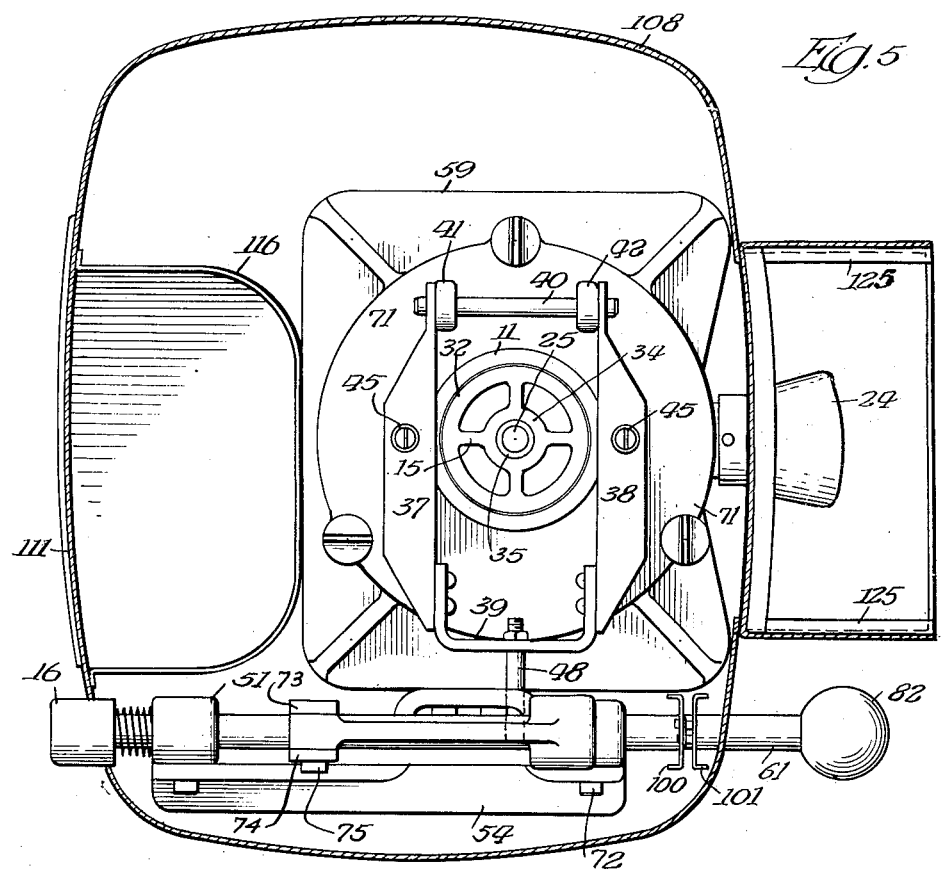
Fig. 5 is a top plan view of the Fig. 1 embodiment, the lid and top of the housing being removed.
Figure 6:
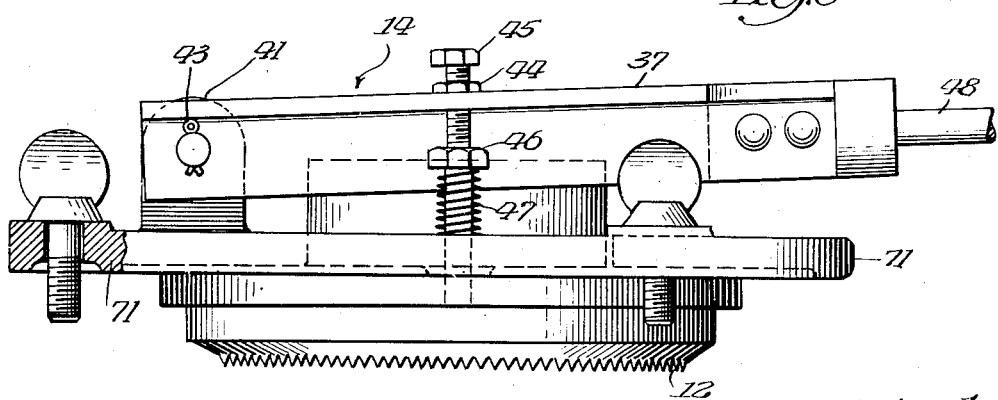
Fig. 6 is a perspective view of the stationary burr carrier and the lever means for axially displacing it with respect to the rotating burr carrier.

Referring now specifically to Fig. 1 of the drawings, there are shown; a hopper 11 into which a cereal, say coffee, to be ground is placed; an adjustable grinding mechanism comprising a pair of burrs 12 and 13 for grinding the coffee in accordance with a selected grind; a lever means generally indicated at 14 for axially displacing the stationary burr with respect to the rotary burr, thereby to adjust the grind; another lever means 49—50 for varying the position of the first-mentioned lever means; a grind-control mechanism comprising a plurality of manually operated push buttons 16, 17, 18, 19, and 20 (Fig. 4) for ordering a particular grind; an electric motor 21 for driving the rotary grinding element; switching means 22 for removing the setting of the control mechanism when the driving motor is stopped, and thus assuring a deliberate choice of grind before a succeeding order can be filled; and a grasping means generally indicated at 23 for assuring control of the grind-control mechanism by the selected push button only.

The overall operation of the Fig. 1 embodiment is very simple. The indicia, "Extra Fine Vac," "Fine Drip," "Medium Perc," "Course Pot," and "Change" are inscribed on the push buttons 16, 17, 18, 19, and 20 respectively. The clerk pours the contents of a bag into hopper 11. The customer pushes the appropriate one of buttons 16, 17, 18 or 19, according to the grind desired. The motor 21 automatically starts and ground coffee is discharged from spout 24 (Fig. 3). When the order has been filled, the clerk pushes button 20 and that operation causes the push button for the selected grind to be released. Then the grinder is in a neutral position and is incapable of supplying coffee of any particular grind until a succeeding order is placed by pushing the appropriate one of the grind-selecting push buttons. These mechanisms are suitably housed and supported in a manner specifically described hereinbelow.

Referring now to Fig. 3, there are shown the details of the adjustable grinding elements. The motive-power unit 21 has a shaft 25. An annular shoulder 26 is formed by a smaller-diameter extension of the shaft. Rigidly mounted on the shaft at this shoulder and keyed thereto at 27 is a rotating burr carrier 28. This carrier is formed with an annular shoulder 29. Secured to the carrier by a plurality of screws 30 is a demountable burr 13. Carrier 28 and burr 13 comprise the rotating grinder element. In accordance with one feature of our invention, this burr carrier is provided with combs 31, located radially outwardly from the burr teeth. These combs perform an important function in mixing the chaff and ground cereal expelled from the outside row of burr teeth.

A mating burr 12 is mounted on a stationary burr carrier 32 by screws 33. Burr 13 is rotated with respect to burr 12 by the action of motor 21. Burrs 12 and 13 are maintained in radial registry and they, as well as shaft 25 and burr carriers 28 and 32, are maintained in accurate concentric relationship by reason of a bearing for shaft 25 which is provided on burr carrier 32. To that end, carrier 32 is formed with integral webs 15, which concentrically position an integral hub 34. Fitted within this hub is a self-lubricating bushing 35.

The stationary burr carrier 32 is constructed with an annular shoulder 36, machined concentric with the bore of bushing 35. The stationary burr 12 is aligned on the shoulder 36 and demountably secured to the burr carrier 32 by means of screws 33. The bushing 35 has sufficient clearance with respect to shaft 25 that the entire stationary unit comprising the elements 12, 35, 32, 34, 33, 15, may be displaced axially with respect to the rotating grinding element 13, 28, thus affording adjustability for purposes of grind control. The elements 12, 32 are hereinafter referred to as the "stationary grinding element."

It is of course within the spirit of our invention to adjust the axial position of grinding element 13, 28 instead of that of the grinding element 12, 32 and we select grinding element 12, 32 as the adjustable element in our preferred embodiment for purposes of illustration.

Important results are obtained by the construction so far described. In the first place, the burrs are mounted for ready axial adjustment and are at all times maintained in radial registry by the shaft 25 and bearing 34, 35. The forming of the carriers with integral annular shoulders assures concentric relation of the burrs. The feature by which the burrs are demountably secured to the carriers permits immediate replacement of worn burrs with a minimum of delay and labor cost. The combs thoroughly intermix expelled ground material and chaff. Most important of all, the spacing between the mating edges of the burr teeth is uniform throughout the circumference of the burrs. Burr wear is thus minimized and consumer good-will is cultivated. Moreover, the annular shoulders 29 and 36 assure proper alignment of replaced burrs and save the expense of delicate aligning operations.

The Fig. 1 embodiment includes a grind-control mechanism for adjusting the stationary grinding element. This mechanism comprises a lever generally indicated at 14. It consists of two arms 37 and 38 interconnected by a fork 39 (Fig. 5). This lever is pivotally fulcrumed by a set pivot 40, journaled in bearings 41 and 42. The set pin is secured by cotter pin 43. Each arm carries a lock nut 44 and an adjusting screw 45. The zero settings of screws 45 determine, for any given selected grind, the depression of machine screws 46. These screws are normally biased outwardly by individual compression springs 47, each confined between the head of its associated screw 46 and grinder case cover 71. Each machine screw 46 passes through a hole in cover 71 and is screwed into the stationary burr carrier 32 as clearly shown in Fig. 3. Screws 46 are screwed into burr carrier 32 at diametrically opposed points. The arrangement of arm, lock nut, adjusting screw, machine screw and compression spring is the same on each arm. The action of the compression springs 47 and screws 46 is such as normally to lift the burr 12 so far upwardly as to render the grind indeterminate. Lifting or lowering of lever 14 and the consequent lifting or lowering of burr 12 determines the spacing between the grinding elements and the fineness of the grind.

Extending from fork 39 is a pin 48. The position of this pin is determined by a second lever means or crank comprising an arm 49, which bears on pin 48, and an arm 50. The position of rotation of lever 49—50 is in turn determined by the push-button and plunger assembly now to be described.

The above-mentioned assembly is supported in a frame which consists of a front support 51, a rear support 52, a lower brace 53, and an upper brace 54. These braces are employed to fasten the frame to legs 55 and 56. These and the other two legs 57 and 58 (not shown) support the grinder case 59 and are in turn supported by a base 60. Slidably mounted in bearings provided in the frame members 51 and 52 are a plurality of plungers 61, 62, 63, 64 and 65, which individually carry push buttons 16, 17, 18, 19 and 20, respectively. Compression springs 66, 67, 68, 69 and 70 normally maintain the plungers in and urge them toward "out" or neutral positions.

The lever 49—50 is pivoted at 72 on rear support 52. Lever 50 consists of two side members 73 and 74, rigidly pinned to arm 49 at 75 and secured together at their lower ends by a screw 76. A tension spring 77 functions to return arm 50 to its neutral position and normally to maintain it there. It will be seen that when arm 50 is in its neutral position, pin 48 is so positioned that the distance between burrs 12 and 13 is at a maximum. Depression of push button 16 and actuation of plunger 61 in response to an order for "Vac" coffee causes levers 49—50 to be turned through a certain angle in a counterclockwise direction (looking at Fig. 1). Depression of push button 19 and actuation of plunger 64 in response to an order for "Pot" coffee rotates the lever 49—50 through a considerably lesser angle. This operation is accomplished by providing on the plungers pins 78, 79, 80 and 81, respectively, and the pins are so longitudinally located with respect to their corresponding push buttons that depression of button 16 causes the arm 49—50 to be turned through a certain angle and depressions of buttons 17, 18, and 19 cause it to be turned through progressively decreasing angles. The degree of turning of arm 49—50 determines the amount of downward displacement of pin 48 by arm 49. Thus it will be seen that depressions of buttons 16, 17, 18 and 19 cause the burrs to be adjusted for progressively increasing axial spacing and for progressively increasing coarseness of grind. On the other hand, when all of the plungers are in the neutral position, springs 47 make the grind indeterminate by increasing the spacing between burrs 12 and 13 to an excessive degree.

Each of the plungers 61, 62, 63, 64 and 65 is provided with its appropriate one of rear control knobs 82, 83, 84, 85 and 86. The purpose of these knobs is to permit control of the grinder from either side of its case. Thus, when it is placed on a store counter, either a customer on one side or the clerk on the other side can set the grind or stop the driving motor. Thus the customer is afforded a visual check on the operations of the clerk.

Plunger 65 carries a switch cam 87 which bears against a spring biased plunger on micro switch 22 and stops the driving motor 21 by opening an energizing circuit when button 20 is depressed. When the button is not depressed, the plunger is biased outwardly, closing that circuit.

In our grind-control mechanism, we not only have a plurality of plungers but we also provide a like plurality of releasable retaining means. That retaining means which comprises spring portions 88 and 89 is associated with plunger 61 and is adapted to grasp and hold a detent 90, concentrically mounted on that plunger, when button 16 is depressed and plunger 61 actuated. Similarly, plungers 62, 63, 64 and 65 are operatively associated, respectively, with spring portions 91—92, 93—94, 95—96, and 97—98. Each of the spring portions is screwed to the rear frame member 52. Spring portions 88 and 98 are individually mounted and the other spring portions, such as 89, 91 are mounted in pairs, each pair being punched from a single piece of metal.

Each of the plungers (for example, plunger 61) is adapted when engaged by its individual one of the retaining means (for example 88, 89) to set the grinder for a selected grind and to release the other retaining means (for example 91—92, 93—94, 95—96, and 97—98) from the other plungers (for example 62, 63, 64, 65, respectively).

To this end, all of the upper detent spring portions 88, 91, 93, 95 and 97 are ganged by an inner clamp member 100 so that they move in unison. Similarly the lower detent spring portions 89, 92, 94, 96, 98 are ganged and have their free ends fastened to an outer clamp member 101. The clamp members are apertured to permit the movement of the plungers. The other plungers 62, 63, 64 and 65 are provided with detents 102, 103, 104, 105, respectively. Each detent (for example detent 104) is adapted to advance between a spring pair (for example spring portions 95 and 96) comprising a lower detent spring portion and an upper detent spring portion when its associated plunger (for example plunger 64) is actuated, thereby to spread said spring portions (for example spring portions 95 and 96) and to release the other plungers (for example 61, 62, 63 and 65), said detent (for example 104) being so shaped as to be grasped by that spring pair (for example 95, 96) upon continued advance of that plunger.

When the button 20 is depressed, not only is the driving motor stopped but all of the other plungers 61 through 64 are at or are restored to their neutral positions. If any one of them is retained by its spring pair, it will be released by the operation of the grasping means (88—98, 100—105). When any one of the grind-control buttons is depressed and before the appropriate detent locks in the detent springs at the rear of the frame, these springs are compelled to ride over the advanced, enlarged surface of the detent and are thus spread, the upper spring portion being raised and the lower spring portion being lowered. Since all lower detent springs move in unison and since all upper detent springs move together, any other plunger which happens to have its detent locked by these springs is released and the return compression spring under the head of the front push button snaps the plunger to its original outward position. Additionally, when any one of the grind-control buttons (16—19) is depressed, the motor reset plunger 65 is released, the switch cam 87 disengages the limit switch 22 and the motor circuit of the driving motor is energized. Conversely, stopping the motor by pushing in button 20 to break the motor circuit automatically releases all of the grind-control buttons (16—19) and compels a new grind adjustment for each customer.

Thus it will be seen that our invention provides a grind control mechanism comprising a plurality of manually operative means (16, 61, 90), (17, 62, 102), (18, 63, 103) and (19, 64, 104), each adapted when actuated to set the grinder for a different grind and means (88, 96, 100, 101) responsive to actuation of any one of said manually operative means for disabling the others of said manually operative means, whereby only the selected manually operative means determines the grind. We also provide an additional manually operative means (20, 65, 105) which is adapted, when displaced in one direction and grasped by that part of the grasping means which includes spring portion 97 and 98, to deenergize the motor 21 and to assure the return of all the other manually operative means to neutral positions.

The whole untary assembly is placed in a suitable housing 108 (Figs. 3, 4, and 5). This housing is provided with a lid 109 hinged at 110. A display window 111 is superimposed over an aperture provided in the housing and is secured by appropriate fastenings 112, 113. A bag of coffee or other cereal displayed 114 is placed on a suitable shelf comprising a shelf bottom 115 and a shelf back 116, located behind the display window.

In conclusion, we have provided a novel coffee grinder comprising in combination a power motor 21, a pair of grinding elements (13, 28) and (12, 32) adjustable to determine the fineness of grind, one of those elements (13, 28) being rotated by the motor 21, pivoted normally neutral fork lever means (37, 38, 39, 40, 41, 42, 43, 44, 45, 46, 47) for axially adjusting the other of said elements (12, 32), a normally neutral crank (50, 72, 73, 74, 75, 76, 49) for positioning said lever means, and control means for turning said crank, thereby to control the grind, said control means comprising a supporting frame (51, 52, 53, 54), a plurality of normally neutrally positioned plungers (61, 62, 63, 64) slidably mounted in said frame, each of said plungers having a detent (90, 102, 103, 104) and being adapted when displaced from neutral to turn said crank by a different amount, a normally neutral plunger (65) having a detent (105) and also slidably mounted in said frame and adapted when displaced from neutral to deenergize said motor 21, and means (66, 67, 68, 69, 70, 88, 89, 91, 92, 93, 94, 95, 96, 97, 98, 100, 101) responsive to actuation to any one of said plungers for returning the other plungers to neutral.

Secured to the rear of the housing is a tray holder 120, formed with an open back and having three pairs of shelves 121, 123, 125, each of which is adapted to support a removable pan 127. Shelves 121—122, 123—124, 125—126 are identical but are secured to the sides of tray holder 120 at different heights. Pan 127 is placed on shelf 121 when a three-pound capacity bag is employed to receive coffee from the spout, on shelf 123 when a two-pound capacity bag is used, and on shelf 125 when a one-pound capacity bag is used.

While we have shown and described what is at present considered to be a preferred embodiment of our invention, it will be obvious to those skilled in the art that various changes and substitutions of equivalents may be made therein without departing from the true scope of the invention, and it is, accordingly, intended in the appended claim to cover all such changes as fall within the true scope of the invention and without the proper scope of the prior art.

Having thus described our invention, we claim:

In an adjustable cereal grinder, a plurality of grinder elements and a grind control mechanism comprising a frame, a plurality of plungers individually slidably mounted on said frame, each of said plungers having a push button secured to one end thereof and a knob secured to the other end thereof, whereby it may be displaced either by a customer on one side of the grinder or by an operator on the other side of the grinder, a plunger-engaging means, means cooperating with said plunger means for setting said grinder for a predetermined grind when any one of said plungers is displaced in one direction and locked by said engaging means, said engaging means comprising a plurality of ganged springs, one for each plunger, said springs being adapted collectively to be spread in response to displacement of said one of said plungers in said direction, thereby to release all other plungers, and compression-spring means bearing on said plungers for displacing each of said plungers in the opposite direction upon release by said engaging means, whereby only the plunger actuated either by a customer on one side of the grinder or an operator on the other side of the grinder sets the grinder for the desired grind.

RICHARD L. SCHUHMANN.
FREDERIC C. RUDOLPH.

REFERENCES CITED

The following references are of record in the file of this patent:

UNITED STATES PATENTS

| Number | Name | Date |
|---|---|---|
| 215,658 | Oberchain | May 20, 1879 |
| 309,187 | Blevney | Dec. 16, 1884 |
| 1,206,716 | Keller et al. | Nov. 28, 1916 |
| 1,704,754 | Marvin | Mar. 12, 1929 |
| 1,928,200 | Faas | Sept. 26, 1933 |
| 1,984,869 | Farley | Dec. 18, 1934 |
| 2,090,634 | Meeker | Aug. 24, 1937 |
| 2,128,226 | Atwood | Aug. 30, 1938 |
| 2,141,311 | Meeker | Dec. 27, 1938 |
| 2,187,102 | Schuhmann | Jan. 16, 1940 |